US00RE38536E1

(19) United States
(12) Reissued Patent
Reznik

(10) Patent Number: US RE38,536 E
(45) Date of Reissued Patent: Jun. 22, 2004

(54) SPARK PLUG AND METHOD OF PRODUCING THE SAME

(76) Inventor: Alexander Reznik, 2141 - 76th St., Apt. 2, Brooklyn, NY (US) 11214

(21) Appl. No.: 10/023,157

(22) Filed: Dec. 18, 2001

Related U.S. Patent Documents

Reissue of:
(64) Patent No.: 6,265,815
Issued: Jul. 24, 2001
Appl. No.: 09/262,633
Filed: Mar. 4, 1999

(51) Int. Cl.[7] ..... H01T 21/02
(52) U.S. Cl. ..... 313/141; 313/144; 445/7
(58) Field of Search ..... 313/141, 144; 445/7

(56) References Cited

U.S. PATENT DOCUMENTS 3,673,452 A * 6/1972 Brennen ..... 313/141
4,551,603 A * 11/1985 Rocklin ..... 219/76.13
4,810,220 A 3/1989 Moore
4,826,462 A * 5/1989 Lenk ..... 427/448
4,881,913 A 11/1989 Mann
5,179,313 A 1/1993 Eves et al.
5,456,624 A 10/1995 Moore et al.
5,465,022 A * 11/1995 Katoh et al. ..... 313/142
5,779,842 A 7/1998 Fawcett et al.
5,897,966 A * 4/1999 Grossklaus et al. ..... 148/535

* cited by examiner

*Primary Examiner*—Kenneth J. Ramsey
(74) *Attorney, Agent, or Firm*—Baker Botts L.L.P.

(57) ABSTRACT

A spark plug has at least two electrodes having ends facing toward one another so as to produce an electrical discharge when an electrical potential is applied to said electrodes, and a layer of an erosion-resistant material applied on each of said electrodes by electro-spark deposition so the lifetime of the spark plug comparing to existing is substantially increased.

27 Claims, 1 Drawing Sheet

Amended

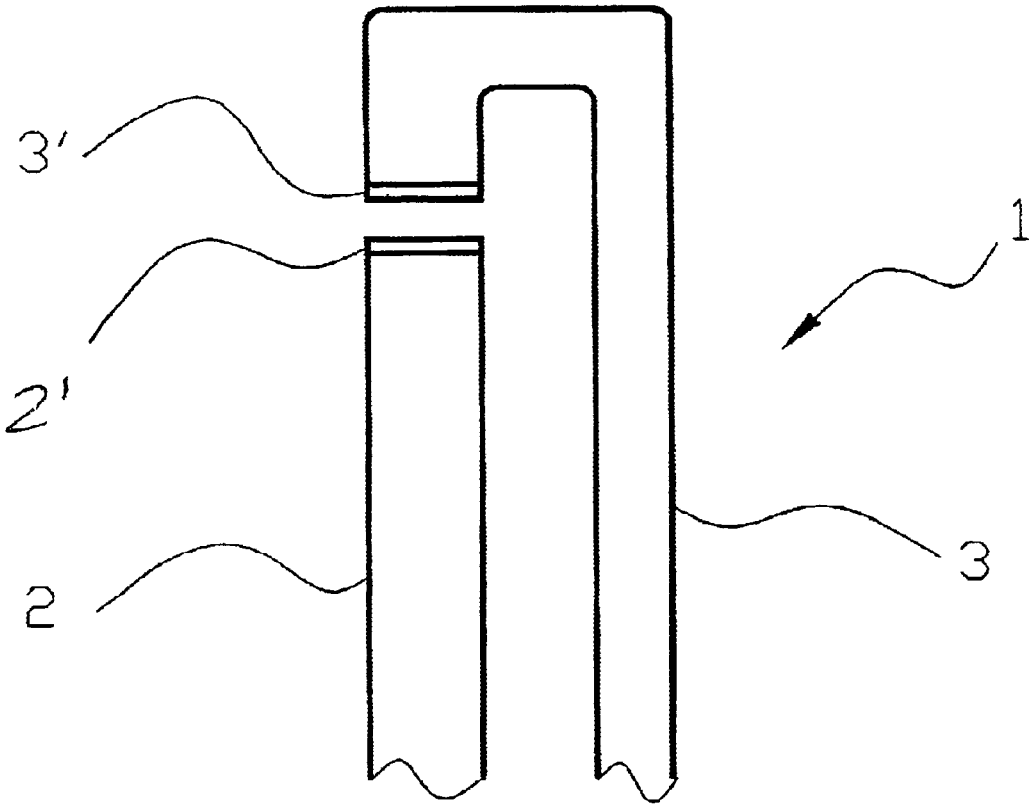
Amended

SPARK PLUG AND METHOD OF PRODUCING THE SAME

Matter enclosed in heavy brackets [ ] appears in the original patent but forms no part of this reissue specification; matter printed in italics indicates the additions made by reissue.

BACKGROUND OF THE INVENTION

The present invention relates generally to spark plugs and methods of producing the spark plugs.

A spark plug for internal combustion engine usually has a center electrode and another ground electrode, which upon supplying of an electrical potential generate a spark for igniting fuel in an internal combustion engine. Since the ignition is performed many thousand times due to an electrical discharge at the electrodes, the electrodes are subjected to erosion which reduces their service life. In order to increase the service life, it was proposed to apply reinforcing materials on the facing surfaces of the electrodes by the range of different techniques. Some techniques require sophisticated equipment and control, following shaping electrode tips into final configuration (attaching by welding small reinforce metal pieces to electrode ends, inserting metal wire in a hole of central electrode tip, plasma welding technique, etc.). Other processes apply a layer of reinforcing material by sputtering or coating methods which can not provide reliable bonding between the electrode substrate and the layer material at high temperature spark plug operating conditions and could result in failure of a spark plug. Most of techniques use precious metals as a reinforcing material, which have extremely high cost. Some spark plugs of the above mentioned general type are disclosed in U.S. Pat. Nos. 3,673,452, 4,810,220, 4,881,913, 5,179,313, 5,456,624; 5,779,842; etc.

SUMMARY OF THE INVENTION

Accordingly, it is an object of the present invention to provide a spark plug and a method of producing the same which avoids the disadvantages of the prior art.

In keeping with these objects and with others which will become apparent hereinafter, one feature of present invention resides, briefly stated, in a spark plug which includes at least two electrodes producing a spark by an electrical discharge and having ends facing toward one another, wherein an additional layer of the material, in particular tungsten, is applied on the ends of the electrodes facing toward one another by electro-spark deposition.

When the spark plugs are formed in accordance with the present invention, their erosion resistance and therefore their service life is substantially increased. The layer produced on the facing surfaces of the electrodes is finally shaped and its bonding to the electrodes is strong due to the diffusion. The diffusion transient zone has linear coefficient of expansion between such of the erosion resistant layer and an electrode material. Thereby, heat stresses that occur on a border between layer and electrode body during the spark plug operation will relieve.

In accordance with another feature of present invention, a method of producing the spark plug is proposed, in accordance with which at least two electrodes are made, and then an additional layer is applied on the end of each electrode facing the other electrodes, the layer composed of tungsten and applied by electro-spark deposition, so that a reliable diffusion bonding is provided between the coating and the spark plug electrode material and heat stresses that occur on a border between the layer and the electrode body during the spark plug operation will be relieved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a spark plug in accordance with the present invention.

DESCRIPTION OF PREFERRED EMBODIMENTS

A spark plug in accordance with the present invention is identified as a whole with reference numeral 1. It has a central electrode 2 and an additional ground electrode 3. The electrodes are arranged so that their ends face one another. When electric potential is applied to the spark plug, a discharge is produced between the facing ends or tips of the electrodes, and generates a spark which ignites a fuel of an internal combustion engines. These sparks plugs are generally known in the art, and therefore additional elements of the spark plugs, such as insulators, casing, etc. are not shown in the drawings.

In accordance with the present invention, an erosion-resistant layer is applied by electro-spark deposition on an end or a tip of each electrode which faces an end or a tip of another electrode. [In accordance with the present invention] *For example*, the tips or the faces of the electrodes facing one another are covered with the additional layers of tungsten [3] *2', 3'*, the layers are reliably bonded to the corresponding electrodes, and the heat stresses that occur on a border between the layer and the electrode body during the spark plug operation will be relieved. Since the layer is erosion-resistant, the service life of the electrodes is substantially increased.

The deposited layer can have a thickness of 10–50 $\mu$m. The transient zone formed due to diffusion of the layer material into the substrate of the spark plug electrode relieves heat stresses on the border between the layer and the electrode body during the spark plug operation. Following machining is not needed after the electro-spark deposition.

It is believed to be clear that other materials can be used for forming the erosion-resistant layers on the tips or facing ends of the electrode, for example platinum, etc.

It will be understood that each of the elements described above, or two or more together, may also find a useful application in other types of constructions and methods differing from the types described above.

While the invention has been illustrated and described as embodied in spark plug and method of producing the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A spark plug comprising two electrodes having ends facing toward one another, so that when electrical potential is supplied to the electrodes, an electrical discharge is produced and a spark is generated to ignite a fuel; and a layer of an erosion resistant material applied to each end of each of said electrodes by the electro-spark deposition so that a reliable diffusion bonding [Is] *is* provided between a coating and a spark plug electrode material.

2. A spark plug as defined in claim 1, wherein said layer of erosion-resistant material is composed of tungsten.

3. A spark plug as defined in claim 1, wherein said layer of erosion-resistant material is composed of platinum.

4. A spark plug as defined in claim 1, wherein said layer of erosion-resistant material is composed of a metal of 5–6th period of The Periodic Table.

5. A spark plug comprising at least two electrodes, said electrodes having ends facing toward one another so as to produce an electric discharge when an electrical potential is applied to said electrodes and to generate a spark for igniting a fuel; and a layer of an erosion-resistant material applied on each of said ends of each of said electrodes by electro-spark deposition so that a reliable diffusion bonding is provided between [the] *a* coating and the spark plug electrode [substrate], and heat stresses occurring on a border between the layer and the electrode body[,] during the spark plug operation[,] are relived and a lifetime of the spark [plugs] *plug* is substantially increased.

6. A method of producing a spark plug, comprising the steps of forming two electrodes having ends facing toward one another so that when electrical potential is supplied to the electrodes an electrical discharge is produced and a spark is generated to ignite a fuel; and applying a layer of an erosion resistant material to each end of each of said electrodes by the electro-spark deposition so that a reliable diffusion bonding is provided between the coating and the spark plug electrode material.

7. A method as defined in claim 6, wherein said layer of erosion-resistant material is composed of tungsten.

8. A method as defined in claim 6, wherein said layer erosion-resistant material is composed of platinum.

9. A method as defined in claim 6, wherein said layer of erosion-resistant material is composed of a metal of 5–6th period of The Periodic Table.

*10. A spark plug comprising:*

*at least two electrodes having respective ends; and*

*a layer of an erosion resistant material which is electro-spark deposited on a surface of the respective end of at least one of the electrodes.*

*11. The spark plug according to claim 10, wherein the surface of the respective end is capable of forming a spark.*

*12. The spark plug according to claim 10, wherein the layer is electro-spark deposited on the surface to establish a diffusion bonding between the surface and the layer.*

*13. The spark plug according to claim 10, wherein a diffusion transient zone is formed on a border between the deposited layer and the surface of the respective end, and wherein the diffusion transient zone reduces a stress as the border during an operation of the spark plug.*

*14. The spark plug according to claim 10, wherein the erosion resistant material includes tungsten.*

*15. The spark plug according to claim 10, wherein the erosion resistant material includes platinum.*

*16. The spark plug according to claim 10, wherein the erosion resistant material includes a metal of a 5–6th period of The Periodic Table.*

*17. The spark plug according to claim 10, wherein the at least two of the electrodes face toward one another.*

*18. The spark plug according to claim 10, wherein the layer is electro-spark deposited on the surface of the respective end of each of the at least two electrodes.*

*19. A method for producing a spark plug, comprising the steps of:*

*providing at least two electrodes having respective ends; and*

*electro-spark depositing a layer of an erosion resistant material on a surface of the respective end of at least one of the electrodes.*

*20. The method according to claim 19, wherein the surface of the respective end is capable of forming a spark.*

*21. The method according to claim 19, wherein the electro-spark depositing step establishes a diffusion bonding between the surface and the layer.*

*22. The method according to claim 19, wherein a diffusion transient zone is formed on a border between the deposited layer and the surface of the respective end, and wherein the diffusion transient zone reduces a stress at the border during an operation of the spark plug.*

*23. The method according to claim 19, wherein the erosion resistant material includes tungsten.*

*24. The method according to claim 19, wherein the erosion resistant material includes platinum.*

*25. The method according to claim 19, wherein the erosion resistant material includes a metal of a 5–6th period of The Periodic Table.*

*26. The method according to claim 19, wherein the at least two of the electrodes face toward one another.*

*27. The method according to claim 19, wherein the electro-spark depositing step is performed on the surface of the respective end of each of the at least two electrodes.*

* * * * *